United States Patent [19]

Sedlar et al.

[11] Patent Number: 5,420,940
[45] Date of Patent: May 30, 1995

[54] CGSI PIPELINE PERFORMANCE IMPROVEMENT

[75] Inventors: Michael F. Sedlar, Walnut; Dennis D. Hansen, Glendora; George G. Sanford, Diamond, all of Calif.

[73] Assignee: Hughes Training, Inc., Arlington, Tex.

[21] Appl. No.: 200,854

[22] Filed: Feb. 22, 1994

Related U.S. Application Data

[63] Continuation of Ser. No. 899,208, Jun. 16, 1992, abandoned.

[51] Int. Cl.⁶ .................................. G06K 9/36
[52] U.S. Cl. .................................. 382/276; 382/293; 382/307
[58] Field of Search ............... 382/41, 44, 46, 56; 348/420, 421, 390

[56] References Cited

U.S. PATENT DOCUMENTS

| | | | |
|---|---|---|---|
| 3,811,110 | 5/1974 | Inose et al. | 382/46 |
| 3,905,045 | 9/1975 | Nickel | 382/44 |
| 4,007,440 | 2/1977 | Kono et al. | 382/46 |
| 4,019,173 | 4/1977 | Kono | 382/46 |
| 4,645,459 | 2/1987 | Graf et al. | 434/43 |
| 4,835,532 | 5/1989 | Fant | 382/44 |
| 4,965,844 | 10/1990 | Oka et al. | 382/44 |
| 5,048,102 | 9/1991 | Tararine et al. | 382/44 |
| 5,048,104 | 9/1991 | D'Aoust et al. | 382/44 |
| 5,070,465 | 12/1991 | Kato et al. | 382/44 |
| 5,175,808 | 12/1992 | Sayre | 382/44 |

OTHER PUBLICATIONS

"A Nonaliasing, Real-Time Spatial Transform Technique", Karl M. Fant, IEEE CG&A, Jan. 1986.

*Primary Examiner*—Joseph Mancuso
*Attorney, Agent, or Firm*—W. K. Denson-Low

[57] ABSTRACT

A method for improving CGSI imaging system throughput by selectively decimating rows and/or columns of object image data prior to warp transformation in order to more closely approach a 1:1 compression ratio. The best results are produced on compressed object image data prior to decompression.

8 Claims, 3 Drawing Sheets

CGSI PIPELINE PERFORMANCE IMPROVEMENT

This is a continuation of application Ser. No. 899,208, filed Jun. 16, 1992, now abandoned.

BACKGROUND OF THE INVENTION

1. Technical Field

This invention relates generally to computer controlled imaging systems and, more particularly, to a method of input image preprocessing which substantially reduces image processing time, database generation and system on-line data storage requirements.

2. Discussion

There are numerous applications for computer controlled imaging systems which require real-time processing of image data to produce a realistic and interactively controllable visual display. One such application is aircraft flight simulators often used in the training of pilots. These systems reduce the expense and danger involved in flight training, especially military flight training, by providing realistic physical and visual simulation of flying a plane. These systems interlink a video display imagery system with a flight simulation computer to produce a visual display of the field of view seen from the window of the cockpit. This display is updated as the plane is apparently dynamically guided around and through a predefined gaming area, in response to the operation of simulated controls.

In order for such systems to provide effective training, the visual display of each scene must be as realistic as possible. Changes in each scene or to various objects therein must be made smoothly and quickly such that they are not distracting and appear to the operator as being responsive in real time to his operation of the simulated controls. The image processing systems used in the generation Of the displays must, therefore, be highly efficient.

Three main techniques have been developed to efficiently generate and process the image data in these systems. The first is known as Computer Generated Imagery (CGI). CGI creates each scene for display using purely mathematical representations of each object and surface to appear in the scene. These mathematical representations are in the form of a series of points which define the outer limits of each object and surface. While this mathematical data is readily manipulable by a computer-based imaging system, the mathematically defined objects and surfaces often lack realism. Highly structured objects such as tanks, buildings and trees, even with extremely complex mathematical representations, often appear cartoonish and unrealistic.

Another approach, Computer Synthesized Imagery (CSI), provides a more realistic visual display by using stored real world images such as digitized photographs. By storing a digitized photographic or similar synthetically created image for each scene in a large indexed database, a computer can access each for display in real time. However, each scene created by CSI is limited in perspective and distance to the point of view of the camera at the time the scene was acquired. Therefore, it is not possible to simulate the dynamic navigation of a very large gaming area without a prohibitive number of photographs, each taken at a slightly different angle.

A third system, Computer Generated Synthesized Imagery (CGSI) improves upon both the CGI and CSI systems by combining the best of both technologies. This system is discussed in detail in U.S. Pat. No. 4,645,459 to Graf et al. entitled COMPUTER GENERATED SYNTHESIZED IMAGERY. The Graf patent is assigned to the Assignee of the present invention and its disclosure is incorporated herein by reference. With Graf's CGSI system, an object database contains digitized photographic quality images of all individual objects necessary to describe the entire gaming area. These objects may include such things as terrain patches, sky, water, trees, bushes, buildings and military targets. Each scene is constructed by placing individual detailed objects on a specified background surface which may be either CGI or CSI generated and which may be laid out in accordance with a known or determinable grid.

The construction of each CGSI scene typically begins with the placement of background surfaces such as patches of land, water or sky. The sequence continues with the addition of objects such as trees, rocks, roads or buildings and then special effects such as shadows and clouds. The scene is normally constructed by beginning with the objects most remote and ending with nearer objects in order to provide proper occlusion between objects. The employment of a "Z" buffer, however, allows the scene to be constructed in any order.

To construct each scene, Graf employs a field of view computer to determine which of the various stored objects, surfaces and special effects will be present in the scene. The field of view computer then coordinates the scene display relative to a particular point of view based upon the simulated vehicle's attitude and position in the gaming area as provided by the vehicle simulation computer. For each instance of every object to appear in the final scene, the field of view computer provides the object identity, its position and the orientation that it must have in the final scene. Object controllers fetch the object images from the object library database and present them to object processing channels which perform the manipulations required to fit the objects into the scene. The stored image of each object used in a scene is individually tailored for perspective, size, position, rotation, warp, and intensity prior to placement in the scene.

Each object image retrieved from the object image database is first temporarily stored in memory as an input image, typically in the form of a square array of pixels uniformly arranged in columns and rows. The input image is then warped to create an output image for display in the scene having the proper perspective and size from the viewpoint of the cockpit. As each object image passes through a warp processing channel, a linear warp transformation shrinks or enlarges the image to the required size and rotates the image as required for final orientation in the display. This creates an output image having an arrangement of rows and columns of pixels different from that of the object and input images.

Since many scenes contain a number of smaller objects, Graf provided for up to 16 objects to be loaded into memory and warped to the output display. However, this limits the system in its ability to deal with highly dynamic scenes which contain a very large number of objects. This is due to the maximum rate at which the object images are warped, given a single channel warp processor and the processing inefficiency associated with combining, sizing, rotating and positioning in a single warp process.

To overcome such limitations a Multiple Object Pipeline (MOPL) Display System was created as disclosed in U.S. Patent Application Ser. No. 622,128 which is assigned to the present Assignee, the disclosure of which is also incorporated herein by reference. The MOPL attempts to overcome the shortcomings of previous CGSI systems by simultaneously warping a number of objects in a multiplicity of parallel pipelined channels in order to improve computational efficiency and provide higher speed imaging. Conservation of database storage and transfer bandwidth is achieved by dealing with objects of variable spacial resolution on a "cell" basis to provide a variable number of cells per object, i.e., a single cell for small simple objects and a large number of cells to represent more complex or larger objects.

Each cell is stored as an object image and is individually translated to proper screen coordinates and then properly occluded with the other cells. For purposes of simplicity, an object such as a tree, even though not rectangular, can be stored as a rectangular array of pixels wherein any pixels within the rectangle but not part of the tree have values equated with transparency wherein those pixels are always transparent to an underlying pixel.

One of many warp transformation processes which can be used by the MOPL to put each "cell" into its proper screen coordinates in the scene is a two pass algorithm which can best be understood with the aid of FIG. 1. Each object image, which contains a single cell to be displayed, is read from memory into an input image which may be a square array of pixels having corners A, B, C and D as indicated. Corresponding screen coordinates A, B, C and D of an output image, which is to be ultimately displayed on the screen, are determined by the field of view computer. In this warp transformation process, the four corners of the input image are mapped to the four corners of the output image in two orthogonal passes.

As shown by FIG. 1, the first pass reads vertical lines or columns of the input image from left to right and writes to an intermediate image. Each column that is read is sized and migrated to its correct vertical axis orientation, the pixels in each column being interpolated to create the correct number of pixels required for that column in the output image. This pass is known as the vertical or Y transformation process. The second pass is the X or horizontal transformation in which horizontal rows of pixels are read from the intermediate image and written to the output image. The object of the second pass is to migrate and interpolate all rows into their correct horizontal axis orientation. Each output image once transformed then becomes part of a larger scene memory wherein each cell to appear in the scene is mapped into its proper position and properly occluded with the other cells prior to display.

The interpolation process used in this warp transformation process is based on a scale factor or compression/decompression ratio which is determined by the ratio of the output image size in pixels to the input image size. The size and position parameters for each interpolation are determined from the input image corner coordinates in relation to those of the output image. The process is computationally invariant for all transformations once the four output corners are established. The interpolation process consumes consecutive input pixels and generates consecutive output pixels. Continuous interpolation over the discrete field of pixels allows the continuous line sizing and subpixel positioning of output lines and columns to eliminate any aliasing of diagonal edges.

To preserve object image integrity and minimize lost information, it is beneficial to maximize the size of the intermediate image. This imposes a restriction on the amount of roll any single object may traverse since the intermediate image collapses to a line at a 45° rotation. For this reason, for an image requiring a rotation of 60°, the object image may be either stored or read in at a 90° rotation and then rotated only 30°. All object image data may even be stored at a 90° rotation in order to facilitate ease of reading pixels in column order. Storing all object images at the highest magnification required such that all transformations basically involve a reduction in size also contributes to the maintenance of image integrity.

To conserve system storage space as well as improve the speed of the input image delivery system, the pixel data corresponding to each cell can be stored in the object image library in a compressed form as a compressed object image. Prior to use of the object in a scene, the compressed cell pixel data is retrieved and then decompressed before becoming the input image to the warp transformation process. A compression technique commonly used by those skilled in the art is the JPEG DCT (Joint Photographic Experts Group Discrete Cosine Transform) image data compression standard. This standard is often used since it enables practical compression ratios of over 20:1. The JPEG-standard compression operates on 8 pixel by 8 line blocks of 64 pixels of an image and can be conveniently implemented using dedicated compression and decompression chips. Data compression, however, can decrease system throughput for objects which appear small on the display.

Other inefficiencies also result from storing all of the cells as uniform sized pixel arrays for both near and far geospecific data. As shown in FIG. 2, even though the cells which make up the various segments of a gaming area terrain are stored as like sized object images, for this example called Levels of Detail (LOD), only those cells making up terrain segments near to the eyepoint such as segment 1-2 use most of the pixel information contained in the object image. The terrain segments farther from the eye point, such as segment 8-9, have the pixel data of their object image spatially compressed into a very small region when mapped onto the screen. This is very inefficient because it involves the processing of many input pixels in order to generate only a few output pixels.

One way to improve efficiency in this situation is to use a multiplicity of object image databases to allow those objects that are to appear in the near terrain to be of a high resolution while providing image information for distant objects having a lesser number of input pixels to be processed. However, a considerable amount of on line storage with a large input bandwidth is required to support multiple databases while simulating movement at or near ground level in the gaming area or movement at very high speeds in airborne situations. An alternate method supporting both near and distant geospecific processing efficiencies and improving overall system throughput is therefore desired.

SUMMARY OF THE INVENTION

The present invention improves imaging system throughput by more closely approaching a 1:1 pipeline compression ratio (input image size close to output image size). This is accomplished by a method of selectively decimating or throwing away spaced rows and/or columns of the object image data prior to use in the warp transformation process. Distant terrain benefits most from this decimation process due to the inefficient higher compression ratios required to map the input data to a much smaller display area.

DETAILED DESCRIPTION OF THE PREFERRED EMBODIMENT

Figure 1:
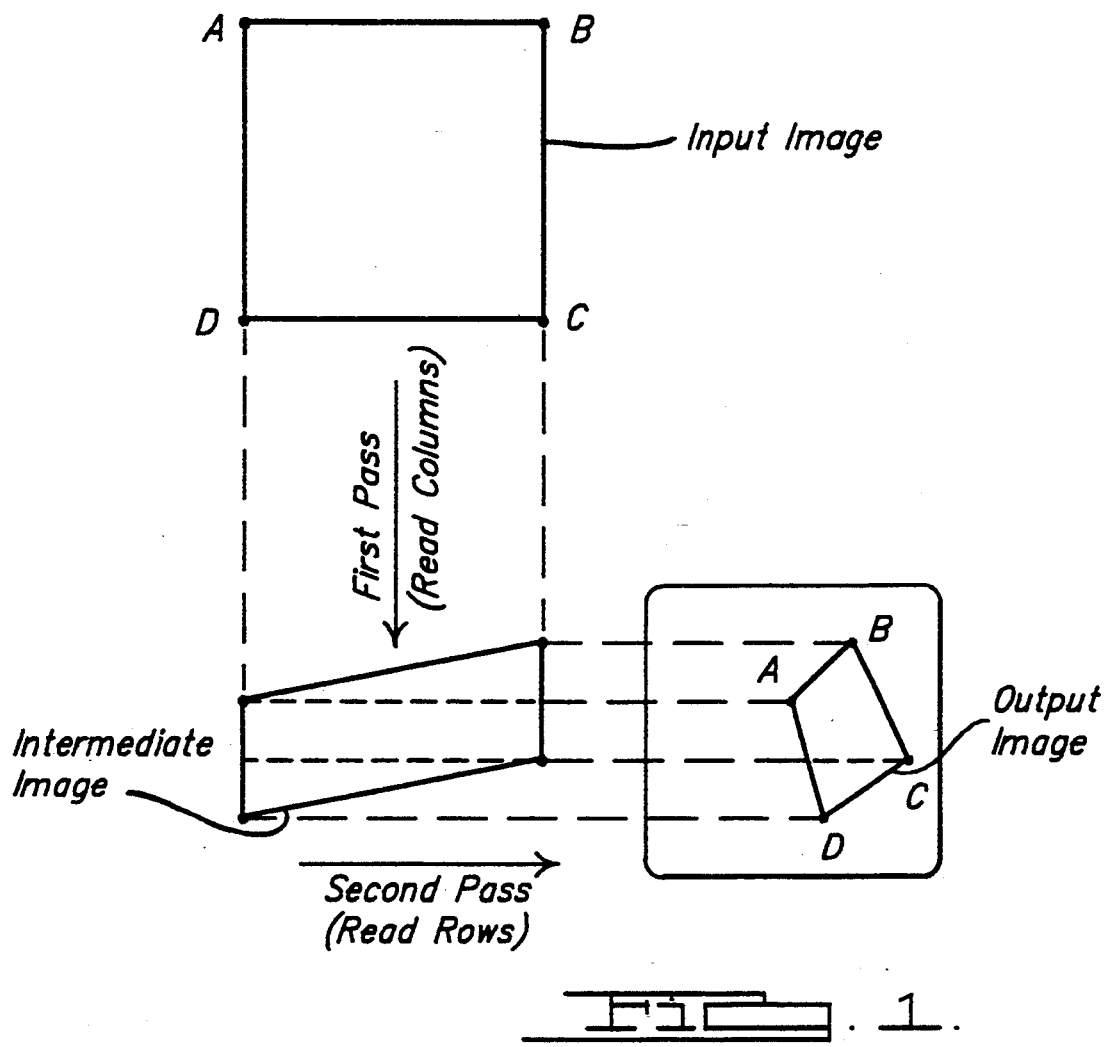
FIG. 1 is a pictorial illustration of the four corner mapping technique of the linear warp transformation process.
Figure 2:
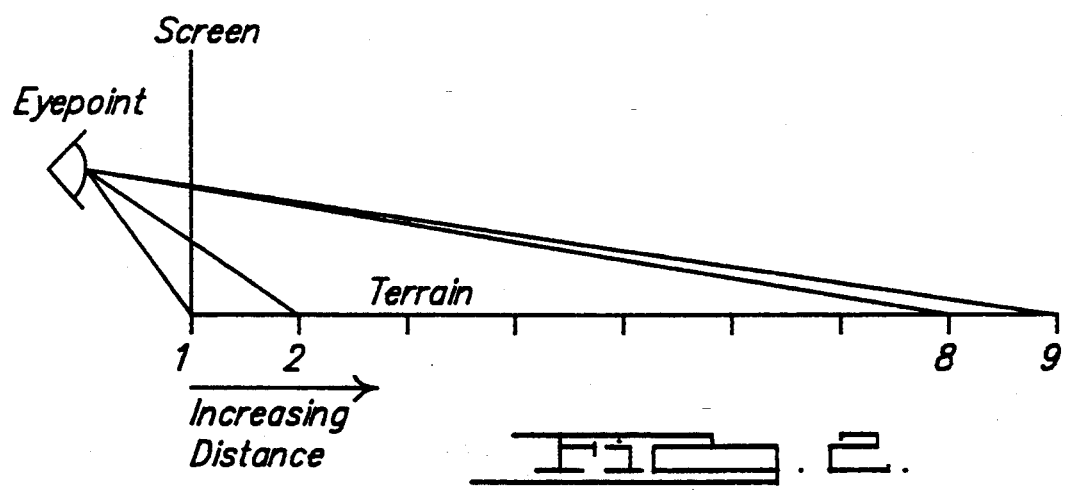
FIG. 2 is a diagrammatic illustration showing the relationship between input and output image size as a function of viewpoint.
Figures 3, 4:
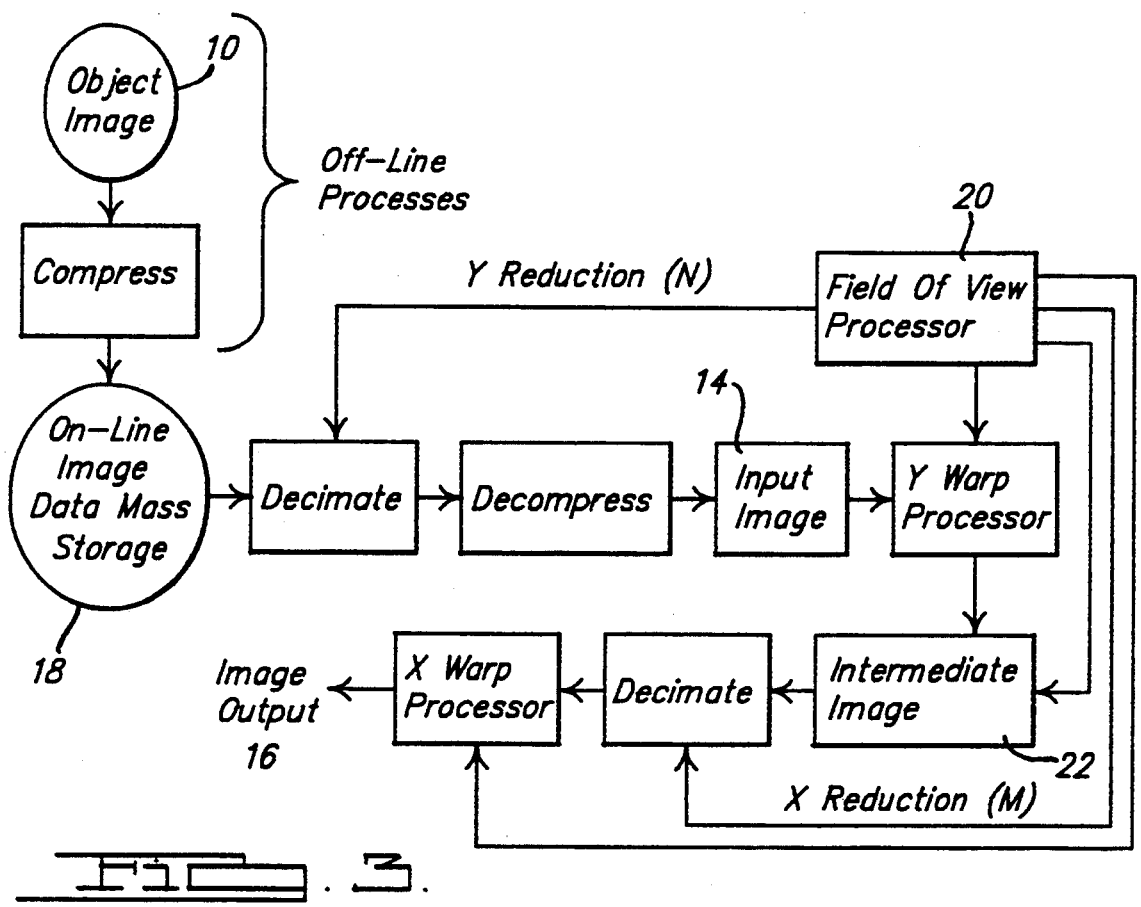
FIG. 3 is a flowchart illustrating a preferred embodiment of an imaging system incorporating the method of the present invention.
FIG. 4 illustrates the preferred manner of assigning coordinate points to an object image.

A preferred embodiment of the method of the present invention is illustrated in the flowchart of FIG. 3. This invention provides a unique method for preprocessing stored image data prior to or in conjunction with a warp transformation process. The method is presented in conjunction with the two pass warp transformation process described above but it is equally applicably to systems employing any one of numerous other warp transformation processes. While the invention is herein described as part of a CGSI system, it should be clear to one skilled in the art that it may also be used in other types of image processing systems such as Computer Generated Imagery with texture mapping or phototexture mapping.

Referring now to FIGS. 3 and 4, the method of the present invention begins with a photographic quality object image 10 which is preferably a MOPL "cell" being a square array of 128 lines of 128 pixels arranged in uniform rows and columns. Object image 10 may be one of many contained in an object image library and stored in an on-line mass storage device 18, each object image containing image data for an object or surface contained in the gaming area.

Figure 5:
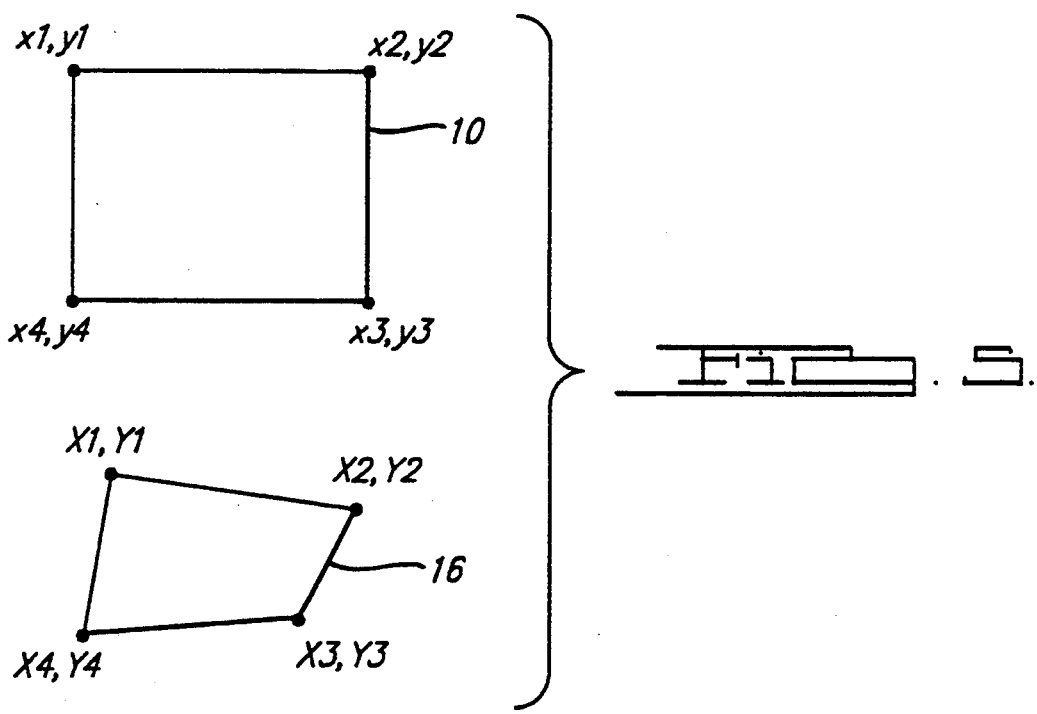
FIG. 5 shows the relationship between a given object image and a corresponding output image.

A given input image 14, into which object image 10 is to be read prior to the warp transformation process, has corner pixel cartesian coordinates x1,y1; x2,y2; x3,y3 and x4,y4 as shown in FIG. 5. Corner coordinate x1,y1 is preferably made to be 0,0 with each unit on each coordinate axis representing one pixel. Also, preferably all coordinates are positive in sign.

A predefined output image 16 may be a quadrilateral or four sided polygon of any shape having corner pixel coordinates X1,Y1; X2,Y2,; X3,Y3 and X4,Y4. These corner coordinates of the output image 16 represent those of the object image 10 when it has been warped for placement in the final scene for display. These coordinates are preferably obtained from field of view processor 20 which calculates these coordinates based upon the desired orientation, position and size of the object in the final display.

The object image 10 is preprocessed according to the method of the present invention by first preventing one or more rows of pixels contained therein from being read into input image 14. The number of rows decimated depends upon the ratio of the output image size to the input image size in the vertical direction. This in essence represents the distance of the object from the eyepoint and/or the perspective at which the object appears with respect to the eyepoint. The rows decimated are preferably evenly spaced based upon the calculation of a vertical or Y reduction factor N.

To calculate N, first a vertical output image screen size value is computed by determining the maximum number of pixels in a single column of the output image 16. For a quadrilateral output image as shown in FIG. 4, this can be adequately approximated by taking the integer value of the larger of (Y4−Y1) and (Y3−Y2). Alternately, simply counting the number of pixels or otherwise finding the maximum number of pixels in a column of output image can also be done, especially in cases involving a non-quadrilateral output image. A vertical object image size may be calculated in a similar fashion by finding the maximum number of pixels in any column of the object image. For a rectangular object image of a predefined size, such as object image 10, this value is already known, in this case 128.

N is then preferably computed by taking the larger of 1 and the integer value of the quotient of the object image size in the vertical direction divided by the output image size in the vertical direction. A maximum value of the reduction factor may also be set to ensure that sufficient information is retained in order for even highly compressed objects to be ultimately recognizable. Alternately, N may be computed using any one of various other similar suitable methods, based upon the relationship between the object and output image sizes. However, the method described above is the one currently known to produce the best results.

The Y reduction factor calculated in the above described or other suitable manner, preferably by field of view processor 20, may then be applied to the object image 10 as shown in FIG. 3. As the object image 10 is being read from on-line mass storage device 18 into the input image 14 as column by column of consecutive pixels, only those in every Nth row are read into input image 14, the remaining rows being ignored or "decimated". Therefore, for images where the output image 16 is of a size approximately equal to that of the object image 10, and therefore the object takes up a proportionately small portion of the scene displayed, N approaches or is equal to 1 and all or virtually all rows of pixels are read with few or no rows of data being decimated. Where the output image 16 is much smaller than object image 10, N becomes larger and more rows of object image 10 are skipped over and not read. This significantly improves efficiency by reducing the number of pixels to be processed in the following warp transformation processes while providing adequate output image quality.

The preprocessing technique of the present invention may also be applied to remove columns of data as well as rows. To accomplish this an X reduction factor M is also computed, preferably by field of view processor 20. The X reduction factor is computed in a fashion analogous to that for the Y reduction factor. Calculation of M begins by finding the approximate maximum number of pixels in a single row of both the output image 16 and the object image 10. For cases with quadrilateral object and output images these values are preferably found by taking the larger of (X3−X4) and (X2−X1) and the larger of (x3−x4) and (x2−x1). M is then calculated by taking the larger of 1 and the integer value of the quotient of the object image size in the horizontal direction divided by the output image size in the horizontal direction. In the two pass warp algorithm, however, the X reduction factor is preferably applied to the intermediate image 22 created by the warp transformation processor as an output of the Y transformation process. This is accomplished by reading only every Mth row from intermediate image 22 into the X warp processor for subsequent output to output image 16.

Figure 6:
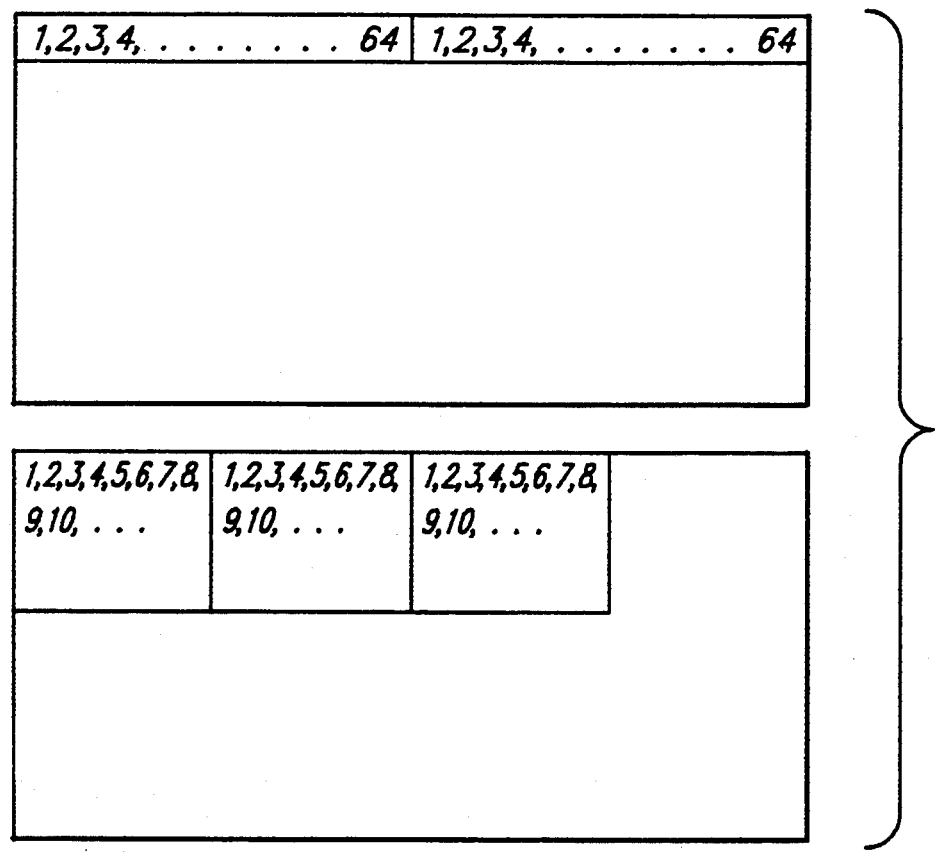
FIG. 6 illustrates a unique variation of the JPEG-DCT standard image data compression technique used in the method of the present invention.

To achieve the greatest improvement in processing speed, the method of the present invention is preferably performed on compressed data prior to decompression. To accomplish this in an efficient manner, the object image 10 is preferably compressed using a method which is a unique variation of the JPEG DCT standard compression technique. Instead of compressing the object image 10 in 8 pixel by 8 line blocks, linear arrays of 1 line by 64 pixels are placed into intermediate groupings of 8 lines by 8 pixels as shown in FIG. 6. The image containing these intermediate groupings can then be compressed using the JPEG-DCT standard in the normal 8 pixel by 8 line blocks, each block in actuality containing a line segment of the object image.

When this compressed image is accessed to be read into the input image 14, decimation is applied using the Y-reduction factor to suppress the insertion of decimated 8 line by 8 pixel blocks (these blocks in actuality containing 1 line by 64 pixel data from line segments of the input image) into the warp processor. In other words, only those 8 line by 8 pixel blocks containing pixel data from every Nth or Mth row or column are read into input image 14 for use in subsequent decompression and processing.

Therefore, as shown in FIG. 3, each object image 10 is compressed and stored in compressed form in mass storage device 18. Once an object image 10 is to become part of the scene displayed, it is read from mass storage device 18 in compressed form and is decimated according to a Y reduction factor N determined by field of view processor 20. Only those 8 line by 8 pixel blocks containing pixel data from every Nth row of the object image 12. This decimated image is then decompressed before becoming input image 14. Input image 14 is then warped in the vertical or Y direction to create an intermediate image 22. Intermediate image 22 can then be decimated if desired in accordance with an X reduction factor M as determined by field of view processor 20. The horizontal warp transformation process then results in an output image 16 which has been scaled and rotated to the proper size and position for final display.

The CGSI interpolation process smooths transitions left by the decimation process through its interpolative averaging producing acceptable anti-aliased imagery while greatly increasing system performance. The one dimensional array of 1 line by 64 pixels can be substituted for the area-based JPEG-DCT implementation with little or no loss of resolution in the restored imagery. This also allows photo imagery to be compressed in multiple directions thus simplifying a multidirectional decimation process.

The present method as described herein has been shown to enable effective warp processor compression ratios closer to 1 and provide a significant improvement in throughput. Pipeline processing time has been reduced by as much as 300 percent. Also, the elimination of precompressed data reduces database generation and on-line storage requirements. Finally, if it is known that only a defined portion of a cell will be used in the output image, such as when the object is to appear at a scene edge, the object image in compressed form may be clipped in a like fashion, prior to decompression.

While the elimination of superfluous distant information is preferably done prior to decompression of the stored data to take advantage of the effective bandwidth savings, it may also be done after decompression or in systems which do not utilize compressed image data. Performed in this way, it still enhances throughput by reducing the number of interpolation calculations in the warp transformation processes. This process may also be used with the same result in systems which do not utilize compressed image data.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A method for preprocessing an object image prior to input into an image warp transformation processor, said object image comprised of a plurality of pixels which are arranged in an array of rows and columns, said warp transformation processor transforming said object image into an output image having a known arrangement of rows and columns of pixels different from that of said object image, said method comprising the steps of:

grouping consecutive strings of 64 pixels in the same row of the object image into 8 pixel by 8 pixel intermediate pixel blocks, wherein each 8 pixel by 8 pixel block in actuality contains a line segment of the object image;

compressing the 8 pixel by 8 pixel intermediate pixel blocks to form a compressed object image;

computing a vertical compressed object image size by approximately determining the maximum number of pixels in a single column of said compressed object image;

computing a vertical output image size by approximately determining the maximum number of pixels in a single column of said output image;

calculating a factor N as a function of the ratio of said compressed vertical object image size to said vertical output image size;

generating a decimated image that includes only pixels in every Nth row of the compressed object image, wherein the pixels for each Nth row are grouped in 8 pixel by 8 pixel blocks of the compressed object image;

decompressing the decimated image to produce an input image; and inputting the input image to the image warp transformation processor.

2. The method of claim 1 wherein the step of compressing includes the step of compressing the 8 pixel by 8 pixel intermediate pixel blocks in accordance with a JPEG-DCT standard.

3. A method for preprocessing an object image prior to input into an image warp transformation processor, said warp transformation processor having a vertical warp transformation processor and a horizontal transformation processor, said object image comprised of a plurality of pixels which are arranged in an array of rows and columns, said warp transformation processor transforming said object image into an output image having a known arrangement of rows and columns of pixels different from that of said object image, said method comprising the steps of:

grouping consecutive strings of 64 pixels in the same row of the object image into 8 pixel by 8 pixel intermediate pixel blocks, wherein each 8 pixel by 8 pixel block in actuality contains a line segment of the object image;

compressing the 8 pixel by 8 pixel intermediate pixel blocks to form a compressed object image;

computing a vertical compressed object image size by approximately determining the maximum number of pixels in a single column of said compressed object image;

computing a vertical output image size by approximately determining the maximum number of pixels in a single column of said output image;

calculating a factor N as a function of the ratio of said compressed vertical object image size to said vertical output image size;

generating a decimated image that includes only pixels in every Nth row of the compressed object image, wherein the pixels for each Nth row are grouped in 8 pixel by 8 pixel blocks of the compressed object image;

decompressing the decimated image to produce an input image;

inputting the input image to the vertical warp transformation processor to produce an intermediate image;

computing a horizontal intermediate image size by approximately determining the maximum number of pixels in a single row of said intermediate image;

computing a horizontal output image size by approximately determining the maximum number of pixels in a single row of said output image;

calculating a factor M as a function of the ratio of said horizontal intermediate image size to said horizontal output image size; and generating a decimated intermediate image that includes only pixels in every Mth row of said intermediate image; and inputting the decimated intermediate image to the horizontal warp transformation processor.

4. The method of claim 3 wherein the step of compressing includes the step of compressing the 8 pixel by 8 pixel intermediate pixel blocks in accordance with a JPEG-DCT standard.

5. A method for preprocessing object image data prior to input into an image warp transformation processor, said object image data having a plurality of pixels associated therewith which are arranged in an array of rows and columns, said warp transformation processor transforming said object image into an output image having a known arrangement of rows and columns of pixels different from that of said object image, said method comprising the steps of:

grouping consecutive strings of 64 pixels in the same column of the object image into 8 pixel by 8 pixel intermediate pixel blocks, wherein each 8 pixel by 8 pixel block in actuality contains a line segment of the object image;

compressing the 8 pixel by 8 pixel intermediate pixel blocks to form a compressed object image;

computing a horizontal compressed object image size by approximately determining the maximum number of pixels in a single row of said compressed object image;

computing a horizontal output image size by approximately determining the maximum number of pixels in a single row of said output image;

calculating a factor M as a function of the ratio of said compressed horizontal object image size to said horizontal output image size;

generating a decimated image that includes only pixels in every Mth column of the compressed object image, wherein the pixels for such Mth column are grouped in 8 pixel by 8 pixel blocks of the compressed object image;

decompressing the decimated image to produce an input image; and inputting the input image to the image warp transformation processor.

6. The method of claim 5 wherein the step of compressing includes the step of compressing the 8 pixel by 8 pixel intermediate pixel blocks in accordance with a JPEG-DCT standard.

7. A method for preprocessing an object image prior to input into an image warp transformation processor, said warp transformation processor having a vertical warp transformation processor and a horizontal transformation processor, said object image comprised of a plurality of pixels which are arranged in an array of rows and columns, said warp transformation processor transforming said object image into an output image having a known arrangement of rows and columns of pixels different from that of said object image said object image, said method comprising the steps of:

grouping consecutive strings of 64 pixels in the same column of the object image into 8 pixel by 8 pixel intermediate pixel blocks, wherein each 8 pixel by 8 pixel block in actuality contains a line segment of the object image;

compressing the 8 pixel by 8 pixel intermediate pixel blocks to form a compressed object image;

computing a horizontal compressed object image size by approximately determining the maximum number of pixels in a single row of said compressed object image;

computing a horizontal output image size by approximately determining the maximum number of pixels in a single row of said output image;

calculating a factor M as a function of the ratio of said compressed horizontal object image size to said horizontal output image size;

generating a decimated image that includes only pixels in every Mth column of the compressed object image, wherein the pixels for such Mth column are grouped in 8 pixel by 8 pixel blocks of the compressed object image;

decompressing the decimated image to produce an input image;

inputting the input image to the horizontal image warp transformation processor to produce an intermediate image;

computing a vertical intermediate image size by approximately determining the maximum number of pixels in a single column of said intermediate image;

computing a vertical output image size by approximately determining the maximum number of pixels in a single column of said output image;

calculating a factor N as a function of the ratio of said vertical intermediate image size to said vertical output image size; and generating a decimated intermediate image that includes only pixels in every Nth column of said intermediate image; and inputting the decimated intermediate image to the vertical warp transformation processor.

8. The method of claim 7 wherein the step of compressing includes the step of compressing the 8 pixel by 8 pixel intermediate pixel blocks in accordance with a JPEG-DCT standard.

* * * * *